United States Patent Office 3,499,396
Patented Mar. 10, 1970

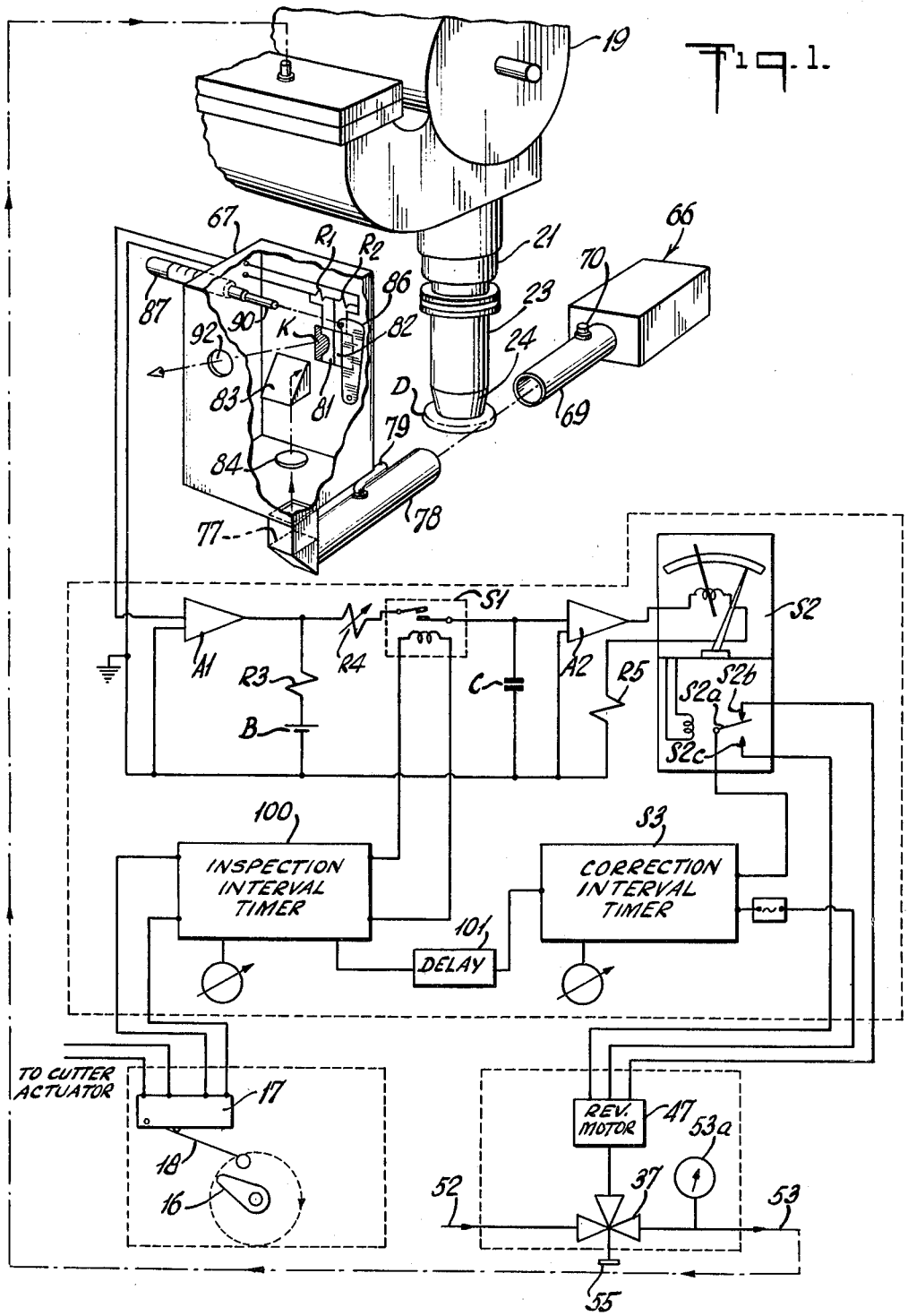

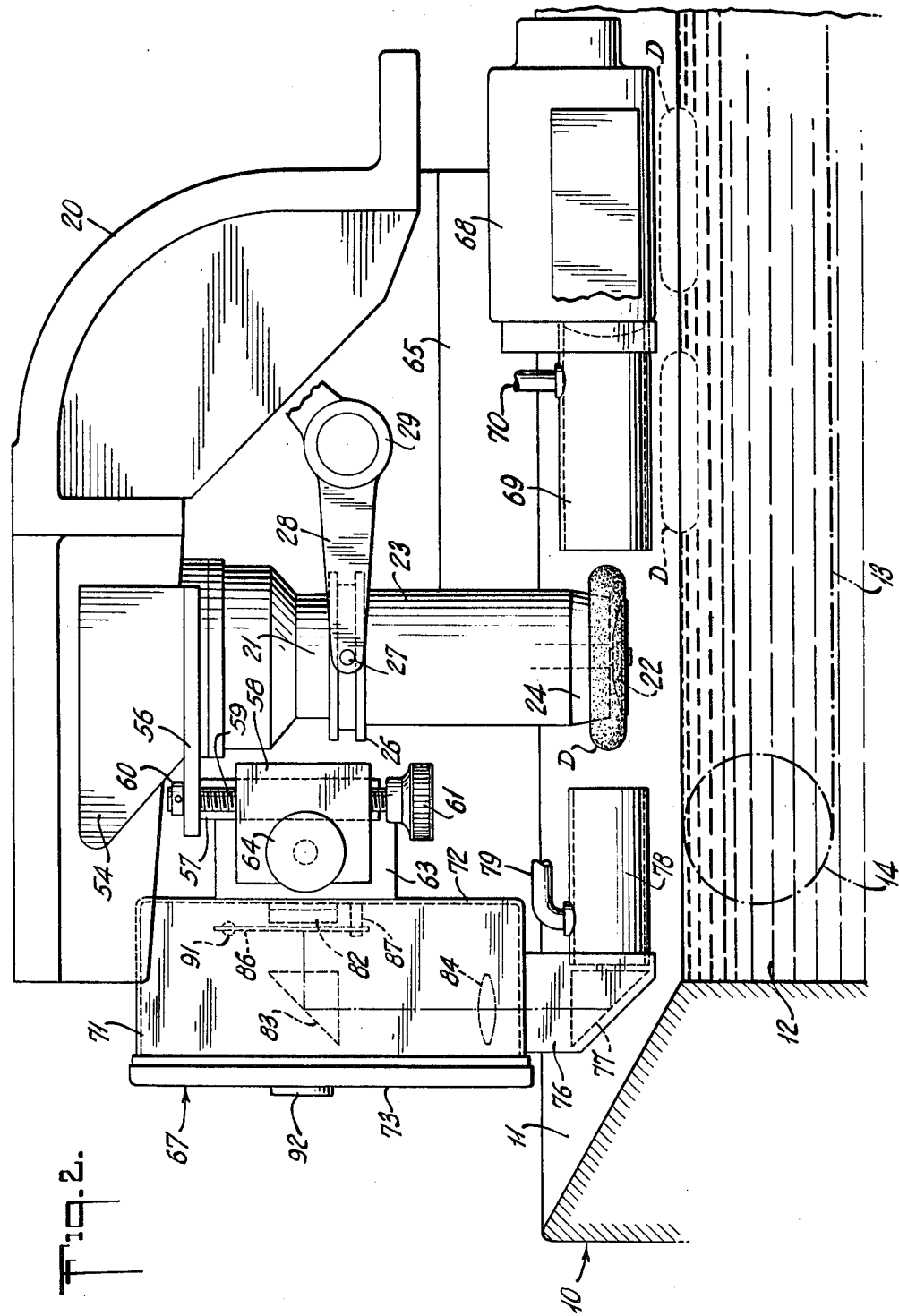

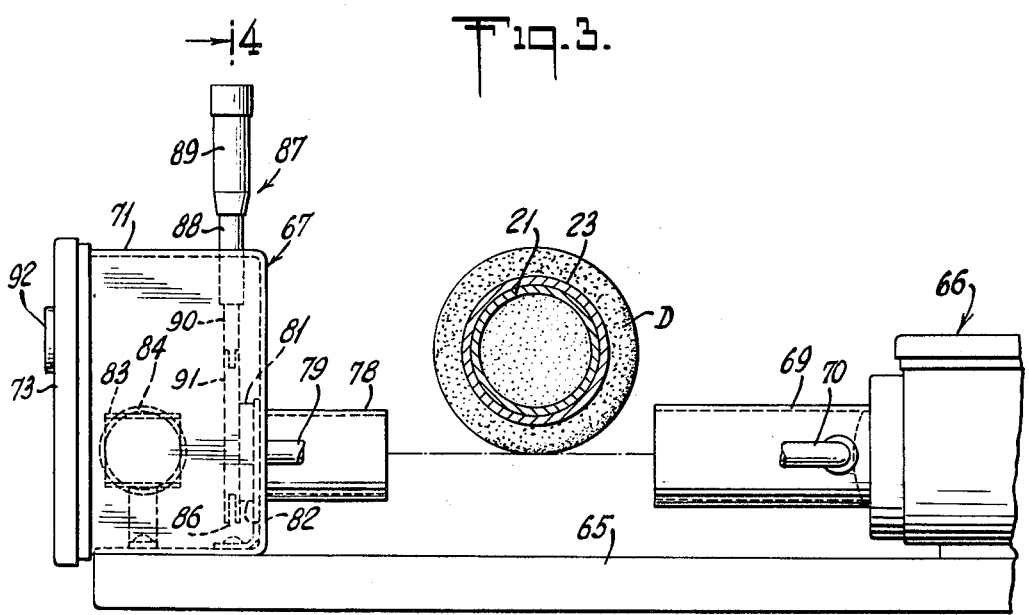
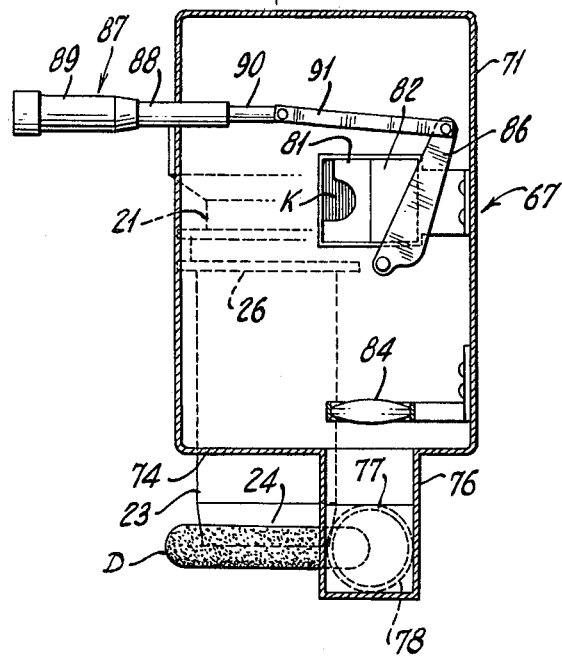

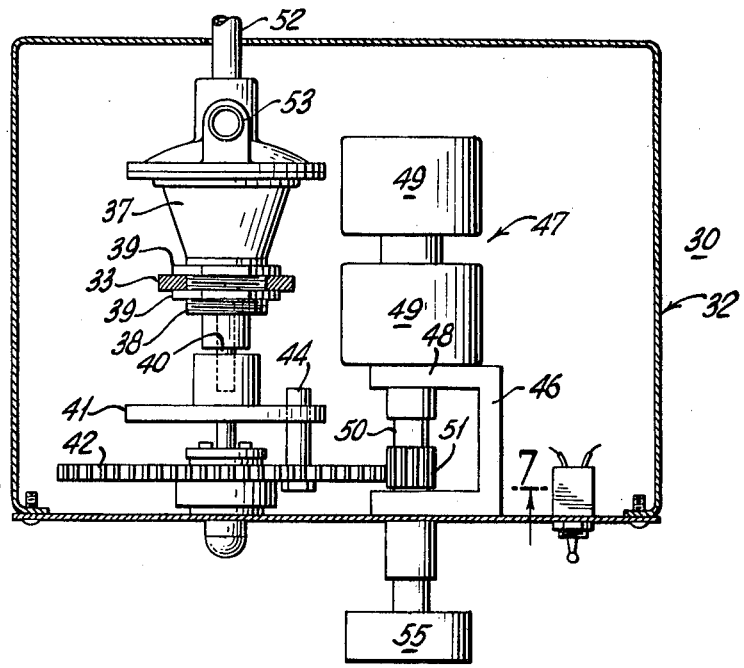
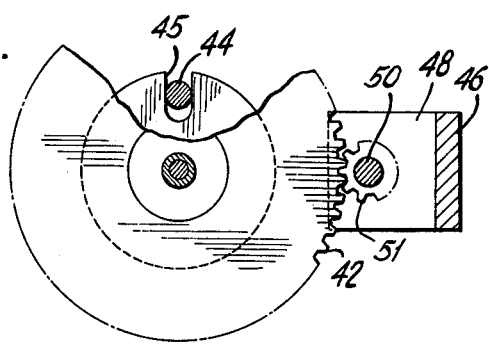
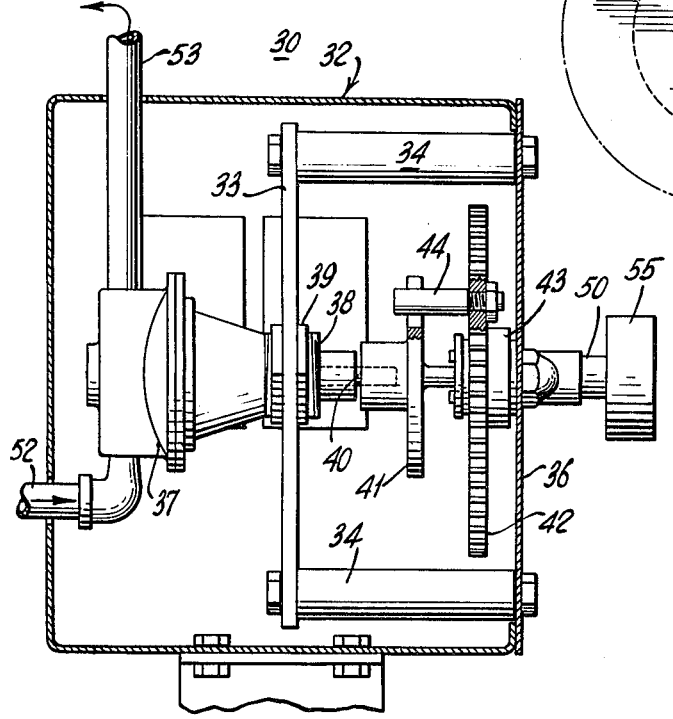

3,499,396
APPARATUS FOR THE REGULATED PRODUCTION
OF SHAPED PIECES OF PLASTIC MATERIAL
Harold B. Kaufman, Jr., New York, and Albert Spiel, Yonkers, N.Y., assignors to DCA Food Industries Inc., New York, N.Y., a corporation of New York
Filed Jan. 11, 1968, Ser. No. 697,112
Int. Cl. A21c 11/16
U.S. Cl. 107—14                                    22 Claims

ABSTRACT OF THE DISCLOSURE

An apparatus for forming ring-shaped pieces of dough of uniformly regulated size or weight including a dough chamber connected to compressed air through a pressure control valve and provided with a depending dough ring extrusion nozzle with an annular extrusion opening and having a reciprocating cutter sleeve. A pair of bridge-connected photocells are exposed to a beam of light directed tangentially along the extrusion opening to cast a shadow of the periodically extruding dough on one of the photocells; a mask being manually movable across the face of the other photocell. The differential signal from the photocells periodically controls the charging of a capacitor at a predetermined time following the actuation of the cutter sleeve and the capacitor charge voltage controls the sense of the periodic energization of a reversible motor which adjusts the pressure control valve whereby to regulate the severed dough piece size each cutting cycle.

BACKGROUND OF THE INVENTION

The present invention relates generally to improvements in apparatus for the production of shaped pieces of plastic material and it relates specifically to an improved apparatus for the production of dough rings of regulated size or weight.

In forming dough rings in the commercial production of doughnuts, the dough is contained in a closed chamber or hopper which is connected to a source of compressed air. One or more vertical tubular nozzles are connected to the hopper and each is provided with a coaxial lower disc defining, with the nozzle bottom edge, an annular extrusion opening, and a slidable coaxial cutter sleeve movable between a lower closed position engaging the disc and an upper open position above the disc. The dough is extruded radially outwardly under the influence of the air pressure to form a ring while the sleeve is raised and the ring is severed from the extrusion nozzle upon lowering of the cutter sleeve to its closed position. The severed ring is commonly permitted to drop into an underlying cooking trough along which it is conveyed to effect the cooking of the dough. The cutter sleeve is synchronized with the cooker conveyor.

The weight and size of the dough pieces are functions of the viscosity of the dough, the pressure within the hopper, the cycle of the cutter sleeve and other parameters. An important requirement in the commercial production of doughnuts, for many reasons attendant to their quality, packaging and marketing, is that they be of substantially uniform weight. However, by reason of differences in the properties of the dough from batch to batch and by reason of the changes with time in some of these properties such as viscosity, and by reason of changes in other dough-shaping conditions and parameters, the weight of the commercially-produced doughnut individually deviates widely from the predetermined standard weight; and the procedure generally followed for regulating the weight of the doughnut is inefficient, time-consuming, inconvenient, permits of wide weight variations and otherwise leaves much to be desired. Conventionally, the machine operator or attendant will spot-weigh fried doughnuts discharged from the fryer and accordingly adjusts a production parameter to compensate for weight differences. This is a manual spot-checking procedure in which the results are obtained a relatively long time following the production of the dough piece and is limited by human error and excessive time lag and accompanied by many drawbacks and disadvantages.

SUMMARY OF THE INVENTION

A principal object of the present invention is to provide an improved apparatus for the controlled production of shaped pieces of plastic material.

Another object of the present invention is to provide an improved apparatus for the extrusion and severing of a plastic material into pieces having a predetermined dimension of weight.

Still another object of the present invention is to provide an improved apparatus for the production of dough rings.

A further object of the present invention is to provide an improved apparatus for the production of dough rings of uniform size or weight by the radial extrusion and severing of successive dough pieces.

Still a further object of the present invention is to provide an improved apparatus of the above nature characterized by its reliability, accuracy, versatility and adaptability.

The above and other objects of the present invention will become apparent from a reading of the following description taken in conjunction with the accompanying drawings which illustrate a preferred embodiment thereof.

In a sense the present invention contemplates the provision of an apparatus for producing shaped plastic pieces comprising means for extruding and separating a plastic material into successive formed piece, means for adjusting said extruding and separating means for varying a parameter of said formed pieces, and means responsive to said parameter during the extrusion of said piece for controlling said adjusting means whereby to regulate said parameter.

The weight of the dough piece is a function of the volume thereof at a given dough density. In turn, volume is a function of the area of the transverse cross-section of the dough piece. If a fixed extrusion and cutting interval is employed, the volume and hence the weight of the extruded dough piece is a function of the rate of extrusion. Accordingly, the dough piece weight may be controlled by regulating the extrusion rate, and the extrusion rate may be measured by measuring the cross-sectional area of the dough piece at a predetermined time during its extrusion. Thus, by regulating the cross-sectional area of the dough piece at a predetermined time in its extrusion, the extrusion rate is regulated and hence the size and weight of the dough piece.

According to a preferred form of the present apparatus as applied to the regulated production of rings of dough in the production of the doughnuts, there are provided a pressure hopper or chamber connected through an adjustable pressure-regulating valve to a source of compressed air and one or more communicating vertical tubular extrusion nozzles depending from the pressure chamber and a coaxial disc located below each of the nozzles and delineating with each thereof an annular extrusion opening. A cutter sleeve slidably engages the nozzle and is vertically movable between a lower closed position engaging the disc and an upper open position above the disc. Means are provided for regularly reciprocating the cutter sleeve simultaneously with a dough piece conveyor which transports the dough pieces along a cooker trough underlying the extruder. A pair of suitably housed photocells are eccentrically disposed relative to one side of the extrusion opening and a light source directs a beam of light tangential to the extrusion opening onto the photocells, the extruded dough intercepting one part of the beam to cast its silhouette onto one of the phoocells; and a manually adjusted mask forms a shadow on the other photocell. The photocells by way of an amplifier and a switch that is momentarily periodically closed in timed relationship with the cutter controls the charge on a memory capacitor. A reversible motor is connected to the pressure regulating valve and is periodically briefly energized in alternative senses in accordance with the capacitor charge whereby to control the chamber pressure and hence the velocity of radial extrusion through the nozzle orifice and thus regulates the dough ring size of weight each extrusion cycle.

Since the size of the dough ring to follow is readjusted at each extrusion cycle to correspond with a preset standard size more closely than before, there is no significant time lag and since the previously needed manual measurements and continuous manual adjustments are no longer required, a more uniform doughnut with minimum deviation is consequently achieved and the drawbacks and disadvantages of the previous procedures are eliminated. The need for continuous personal surveillance and manual adjustment is removed once the initial conventional operating adjustments have been performed to standardize the product weight.

BRIEF DESCRIPTION OF THE DRAWING

FIGURE 1 is a diagrammatic and schematic view of an apparatus embodying the present invention;

FIGURE 2 is a fragmentary side elevational view thereof together with an associated continuous fryer;

FIGURE 3 is a fragmentary top plan and sectional view of the extrusion nozzle and sensing section;

FIGURE 4 is a sectional view taken along line 4—4 in FIGURE 3;

FIGURE 5 is a top plan view, partially in section, of the hopper pressure-regulating valve control assembly;

FIGURE 6 is a side elevational view thereof, partially in section; and

FIGURE 7 is a fragmented sectional view taken along line 7—7 in FIGURE 5.

DESCRIPTION OF THE PREFERRED EMBODIMENT

Referring now to the drawings which illustrate a preferred embodiment of the present invention as applied to the production of doughnuts, reference numeral 10 generally designates a continuously-deep-fying unit of conventional constuction, only the trailing or feed end of which is shown. Frying unit 10 includes an elongated trough 11 containing a hot cooking oil 12 provided with means for heating the oil 12, and located in trough 11 is a pair of transversely spaced, longitudinally-extending sprocket chains 13 supported and driven by longitudinally-spaced pairs of sprocket wheels 14, chains 13 supporting in known manner transversely extending outwardly projecting flights which delineate along the upper run of chains 13 successively-longitudinally spaced pockets which advance floating pieces of dough along the length of the trough 11.

Associated with fryer unit 10 is a cam element or arm 16 which is drive-coupled to the sprocket wheel drive so as to rotate a single revolution of a plurality of revolutions for each pocket or increment advance of sprocket chains 13 depending on the dough ring production arrangement. A normally open double pole switch 17 is mounted adjacent cam 16 and includes an actuating arm 18 provided with a follower located in the path of cam 16 whereby to periodically simultaneously close the two pairs of switch terminals as the rise portion of cam 16 engages the follower on arm 18.

A pressure chamber or hopper 19 of known construction is suitably mounted by means of a bracket assembly 20 and is either transversely movable in known manner across the trailing section of fryer unit 10 and sprocket chains 13 or is stationary and associated with a plurality of dough ring extruder members. Hopper 19 includes either a rotary air lock and associated hopper or a removable cover which permits the loading of the hopper with the dough to be shaped and the pressurizing of the closed chamber with compressed air. Hopper 19 has separably secured thereto one or more transversely-spaced depending vertical tubular cylindrical nozzles 21. A frustoconical disc 22 is coaxially mounted below the bottom edge of nozzle 21 by an axial rod supported by the nozzle and delineates with the nozzle bottom edge an annular extrusion opening through which a dough ring D is extruded. A cutter sleeve 23 slidably engages nozzle 21 and is provided with a bottom-tapered cutting edger 24 lowered and raised with sleeve 23 between a lower closed position engaging disc 22 and a raised open position above disc 22 to expose the annular extrusion opening. Sleeve 23 terminates at its top in a peripherally-grooved collar 26 which is engaged by opposite pins 27 carried by the forked leg 28 of a pivoted crank 29 the rocking of which effects the reciprocation of cutter sleeve 23. A drive mechanism of known construction rocks crank 29 each time switch 17 is closed to raise and lower cutter sleeve 23 which opens the extrusion opening to effect the extrusion of a dough ring, and thereafter closes the extrusion opening and severs the dough ring which drops into an underlying conveyor pocket. The nozzle carrying chamber 19 may be reciprocated across fryer 10 to deposit a plurality of side-by-side dough rings into each of the successive conveyor pockets by an arrangement known in the art, or a plurality of concurrently-actuated nozzles and cutter sleeves in laterally-spaced positions may be connected to chamber 19.

In order to regulate the weight of the extruded and severed dough rings as reflected by the size or volume thereof, there is provided a chamber pressure-regulating assembly 30 which includes a housing 32. A bar 33 is supported in housing 32 by a pair of spaced parallel posts 34 secured to and projecting inwardly from the housing front wall 36. A conventional adjustable air pressure regulating valve 37 is mounted on bar 33, being provided with a threaded neck 38 engaging a medial opening in bar 33 and locked to said bar by a pair of nuts 39 engaging neck 38 and opposite faces of bar 33.

The pressure-regulating valve 37 is provided with a rotatable and axially-movable adjusting shaft 40 which projects rearwardly through neck 38 and has a disc 41 coaxially affixed thereto, disc 41 being provided with a radial slot 45 extending to the periphery of the disc 41. A gear 42 is rotatably mounted to the rear face of wall 36 coaxial with valve shaft 40 by means of a bearing member 43, disc 41 being provided with a rearwardly-directed coaxial shaft slidably rotatably registering with an axial bore in bearing member 43. A rod 44 is eccentrically mounted on gear 42 and projects rearwardly therefrom into engagement with the disc slot 45 whereby rotation of gear 42 rotates disc 41 while permitting axial movement thereof.

A U-shaped bracket 46 having parallel laterally-extending legs is mounted on the rear face of housing wall 36 laterally offset from gear 42. A reversible drive motor assembly 47 is mounted on the rear leg 48 of bracket 46 and may include a pair of oppositely rotatable coaxial motors with coupled drive shafts. A shaft 50 is journalled between the legs of bracket 46 and is connected to the drive shaft of the reversible motor assembly 47 and projects forwardly of housing wall 36. A spur gear 51 is secured to shaft 50 and meshes with gear 42, and a knob 55 is mounted on the front end of shaft 50.

The input to regulator valve 37 is connected by a pipe 52 to a source of compressed air and the output thereof is connected by a pipe 53 to pressure chamber 19. Thus, energization of one of motors 49 rotates shaft 40 by means of the gear transmission in a first direction to adjust valve 37 to increase the hopper air pressure and energization of the other motor 49 rotates shaft 40 in an opposite direction to decrease the air pressure in pressure chamber 19. A pressure gauge 53a is provided in communication with pipe 53 to facilitate initial manual adjustment of chamber air pressure.

The dough ring sensing and measuring assembly is supported in a manually-adjustable predetermined position relative to a nozzle 21 by means of a bracket 54 affixed to support 20 with horizontal mounting arm 56. Depending from the end of mounting arm 56 is a vertical track member 57 which vertically slidably supports a block 58 having a vertical tapped bore formed therein. An adjusting screw 59 engages the tapped bore in block 58 and terminates at its top in a stub shaft which rotatably engages an opening in arm 56. Screw 59 is restricted against axial movement by a collar 60 engaging the upper end of the stub shaft and the top face of arm 56. The lower end of screw member 59 is provided with a knob 61 the rotation of which effects the vertical adjustment of block 58.

A mounting bracket 63 is supported in any suitable manner, such as by means of guide rods, not shown, by block 58 so as to be transversely movable relative thereto. An adjusting screw 64, terminating in a knob along the face of block 58, engages a transverse horizontal tapped bore in the block and rotatably engages bracket 63 whereby rotation of knob 64 effects the lateral or transverse adjustment of bracket 63. Suitable means, not shown, such as set screws or the like, are provided for releasably locking bracket 63 in any desired adjusted position.

The dough ring cross-section area measuring system includes a longitudinally-extending mounting bar or tube 65 supported in a suitable manner by and adjustable with bracket 63 and supporting at one end thereof a light projector 66 and at the opposite end a light-sensing assembly 67. The light projector includes a lamp and optical system of conventional construction located in a housing 68 and directing a beam of light longitudinally rearwardly through an opening in the casing along a path tangential to and laterally offset from the annular extrusion opening, this beam having a cross-sectional area extending laterally from the extrusion opening a distance greater than twice that reached by the extruded dough ring, as will be hereinafter set forth. Extending from the rear wall of casing 68 along the path of the light beam to a point short of extruder nozzle 21 is a tube 69 which is connected at a point adjacent casing 68 by a pipe 70 to a blower whereby to effect a flow of air outwardly through tube 69 to prevent any deposits on the projector optical system which might interfere with or obscure the projected light beam.

The sensing assembly 67 comprises a housing 71 joined at a side wall thereof on support tube 65 and includes a front wall 72, a removable access cover 73 and a bottom wall 74. Depending from bottom wall 74 is a casing 76 housing a 45° reflector prism 77 having an inclined reflector surface facing upwardly through registering openings in housing 71 and casing 76 and forwardly through a casing front opening. A tube 78 coaxial with tube 69 extends from the front opening in casing 76 to a point short of nozzle 21 and is connected at point adjacent to housing 76 by a pipe 79 to an air blower to effect an outward flow of air through tube 78 thus to prevent the entrance of deposits into the sensing optical system.

A bracket plate 80 is mounted on the side wall of housing 71 and extends along front wall 72 and supports on its rear face a pair of side-by-side photoelectric members 81 and 82 of flat rectangular configuration. The photoelectric members may be silicon photoelectric cells as illustrated, and are series-connected in opposing or bucking relationship. A second 45° prism 83 is suitably supported in housing 71 at the level of the photocells 81 and 82 and in vertical alignment with prism 77 to reflect light directed axially along tube 78 to prism 77 and reflected upwardly therefrom, onto photocells 81 and 82. A lens 84 is positioned between prisms 77 and 83 and is dimensioned to form an image on the faces of photocells 81 and 82 of the medial transverse plane across nozzle 21. Thus a silhouette of the transverse cross-section of the dough extruded from nozzle 21 is focused on photocell 81, the remainder of photocell 81 and photocell 82 being exposed to the unimpeded light from projector 66.

An adjustable masking member in the form of a flat elongated blade 86 is pivoted at its lower end to a post projecting from front wall 72 at a point directly below the medial line of photocells 81 and 82 and is movable across the face of photocell 82. A conventional calibrated micrometer screw member 87 is mounted on a side wall of housing 71 and includes a stationary barrel 88, a rotatable spindle 89 and a rod 90 which is axially movable by the rotation of spindle 89 and which is connected by a link 91 to the upper end of blade 86. Thus, by rotating spindle 89 the area of photocell 82 masked by blade 86 may be adjusted. An eyepiece 92 is mounted on housing rear wall 73 at the level of photocells 81 and 82 and laterally offset from prism 83 to afford a view of photocells 81 and 82 and the shadowing and masking thereof.

A pair of similar terminals of photocells 81 and 82 are interconnected and the opposite pair of similar terminals are connected to the input terminals of an amplifier A1 whose output signal varies with the input signal, one of said input terminals being grounded. Each of photocells 81 and 82 is shunted by a resistor R1 and R2 respectively. The output terminal of amplifier A1 is connected in series with a resistor R3 to one terminal of a voltage source B the other terminal of which is connected to ground. A memory capacitor C is connected in series with a variable resistor R4 and the normal open contacts of a relay switch S1 between ground and the ungrounded output terminal of the amplifier A1. Thus, upon the closing of relay switch S1 capacitor C is charged toward a value dependent upon the output signal of amplifier A1 which is controlled by its input signal from photocells 81 and 82.

A variable delay pulsing network 100 which may be of known circuitry has its trigger input connected to one pair of terminals of switch 17 and its pulse output connected to one solenoid of relay switch S1. The output of network 100 is a short pulse sufficient momentarily to close switch S1, the generated pulse occurring at an adjustable interval following the closing of switch 17, which interval is adjusted in accordance with the parameters of the wanted dough ring formation and may be of the order of 0.1 to 1.0 second, the pulse duration being of the order of about 0.002 second.

Capacitor C is connected across the input of an amplifier A2 of known circuit having a very high input impedance. The output of amplifier A2 is connected through a resistor R5 to the input of a meter type adjustable current relay S2 of known construction and a slave relay that includes a solenoid-actuated switch arm S2a and opposing contacts S2b and S2c, contact S2b being closed when the input current to meter relay S2 exceeds an adjustable predetermined value and contact S2c being closed when the current falls below said value.

Meter relay switch arm S2a is connected through a solid state electronic switch S3 to one terminal of a source of current, the other terminal of which is connected to the common terminal of the reversible motor assembly 47. An output of the adjustably timed pulse generator network 100 is connected through a delay network 101 to the control input of switch S3. Switch network S3 is of a known construction in which the output terminals are closed upon the application of a pulse signal to the input control terminal, the output terminals being closed for an interval of time which is selectively manually adjustable. The meter relay switch contacts S2b and S2c are connected to opposite terminals of the reversible motor assembly 47.

It should be noted that the various networks and switches forming the circuit illustrated in FIGURE 1 are so related and phased that an increase in the doughnut ring shadow cast on the photocell 81 over the adjusted standard shadow on the photocell 82 results in an energization of the reversible motor assembly 47 to reduce the pressure level of regulator valve 37 and a decrease in said shadow below the standard shadow results in the energization of the reversible motor assembly to increase the regulator valve pressure.

Considering now the operation of the apparatus described above, the sensing assembly including the sections 66 and 67 is manually adjusted by means of screws 59 and 64 until properly positioned as determined by the silhouette viewed through eyepiece 92, and blade 86 is adjusted by means of the micrometer member 87 in accordance with the desired size or weight of the doughnut to be produced. Upon closing of switch 17 by cam 16 the opening and closing cycle of the cutter sleeve 23 is initiated, dough being radially extruded through the annular extrusion opening to form a dough rind D and its silhouette K is focused by the prism and lens system upon the photocell 81, the other photocell 82 being exposed to the same beam as partially intercepted by the masking blade 86. As the dough ring silhouette K increases, the differential signal from the photocells 81 and 82 ts applied to the input of amplifier A1 varies, causing the output to vary correspondingly. A predetermined time following the closing of the switch 17 and the opening of the cutter sleeve 23, as determined by the preadjusted network 100, the solenoid of switch S1 is momentarily energized to momentarily close the switch S1 and connect the memory capacitor C to the output of the amplifier A1. At a rate depending on, among other conditions, the adjusted value of the variable resistor R4, the capacitor C is charged toward a voltage which depends upon the output of the amplifier A1 and is dependent on the size of the dough ring silhouette on the photocell 81 during the interval switch S1 is closed. The output of amplifier A2 as controlled by the charge on capacitor C effects the energization or deenergization of the solenoid of switch S2 alternatively to close switch contact S2b or S2c. A short interval after the regulation of the charge on capacitor C, as aforesaid, and as determined by delay network 101, switch S3 is closed for a short interval to energize reversible motor assembly 47 in a sense determined by which of the switch contacts S2b or S2c is closed correspondingly to adjust valve 37 for an increment dependent on the adjustment of switch S2 and in a direction dependent upon the direction of rotation of motor assembly 47. As set forth above, where the silhouette projected on photocell 81 is greater at the time of the closing of switch S1 than the standard silhouette area as adjusted by blade 86, then motor assembly 47 is energized in a sense to decrease the regulated pressure of valve 37, and when such silhouette is less, the sense of the motor energization is such as to increase the regulated pressure of valve 37.

An increase or decrease in the valve regulated pressure effects a corresponding increase or decrease in the air pressure in the chamber 19 which, in turn, respectively increases or decreases the extrusion rate of the dough. Since the extrusion opening and dough-cutting cycle is fixed, an increase in the chamber pressure results in an increase in the extrusion rate and dough ring size, and a decrease in chamber pressure results in an increase in the extrusion rate and dough ring size thereby to effect the regulation of the dough ring size or weight to the adjusted standard and the production of dough rings of uniform size and weight.

By the employment of two photocells 81 and 82 in the manner described under substantially identical environmental conditions, variations of sensitivity with temperature are balanced and the effectiveness of any lens obscuration and beam obscuration due to fat, steam and the like are balanced to a maximum degree. Moreover, the intensity of light incident on the photocells 81 and 82 are substantially the same, any variations in the projected beam being equal on the two photocells. The location of photocells 81 and 82 adjacent each other on the same heat sink support in the housing, which has a relatively high heat capacity and long thermal time-constant, insures that they are at about the same temperature.

The regulated dough ring size may be increased or decreased by respectively increasing or decreasing the area of photocell 82 masked by blade 86 by adjusting the micrometer screw 87. The variation in the chamber pressure is a function of the signal across photocells 81 and 82 connected in opposition so that a change in the masking of photoelectric cell 82 will effect a corresponding regulation of the silhouette projected on photocell 81 and accordingly vary the chamber pressure. Resistor R4 is adjusted to effect the charging rate of capacitor C thereby to control the sensitivity of the network. The increment variation of the regulator valve is controlled by adjusting the closing interval of switch S3.

While there has been described and illustrated a preferred embodiment of the present invention, it is apparent that numerous alterations, omissions and additions may be made without departing from the spirit thereof.

What is claimed is:

1. An apparatus for producing shaped plastic pieces comprising means for extruding a plastic material, means for separating said extruded plastic material into successive formed pieces, means for adjusting the extrusion rate of said extruding means for varying a parameter of said formed pieces, and means responsive to said parameter during the extrusion of a plastic piece for controlling said extrusion rate adjusting means thereby to regulate said parameter.

2. The apparatus of claim 1, wherein said parameter includes the rate of change in size or weight of said plastic piece during the extrusion thereof.

3. The apparatus of claim 1, wherein said parameter includes the rate of change of the transverse cross-section of said plastic piece during the extrusion thereof.

4. An apparatus for producing shaped plastic pieces comprising means for extruding a plastic material, means for separating said extruded plastic material into successive formed pieces, means for adjusting said extruding means for varying a parameter of said formed pieces, and means responsive to said parameter during the extrusion of a plastic piece for controlling said adjusting means thereby to regulate said parameter, and including a first photosensitive member, a source of light directed toward said photosensitive member across the path of extrusion of said plastic material, and means responsive to said photosensitive member in accordance with the area of the silhouette projected thereon by said extruded plastic material.

5. The apparatus of claim 4, including a second photosensitive member exposed to said light source, and adjustable masking means positioned between said light source and said second photosensitive member, said control means being responsive to said first and second photosensitive members.

6. The apparatus of claim 1, wherein said extruding means comprises a pressure chamber containing said plastic material and having a depending extrusion nozzle and means for supplying air under pressure to said chamber, and said adjusting means comprises means for varying the air pressure in said chamber.

7. The apparatus of claim 6, wherein said separating means comprises a cutter disc supported below and coaxial with said nozzle and a cutter sleeve slidably engaging said nozzle and movable between a closed position engaging said disc and an open position above said disc.

8. An apparatus for producing shaped pieces of dough comprising a chamber for containing a dough and air under pressure, a vertical extrusion nozzle communicating with said chamber, means for severing dough pieces extruded through said nozzle, means for periodically actuating said severing means, means for measuring a parameter of the dough piece at a predetermined time during the extrusion thereof from said nozzle, and means responsive to said measuring means for controlling said chamber air pressure to regulate said dough piece parameter.

9. The apparatus of claim 8, wherein said parameter comprises the transverse cross-sectional area of said extruded dough.

10. The apparatus of claim 9, wherein said measuring means comprises a first photosensitive member, a source of light, means for directing a beam from said light source toward said photosensitive member across the path of extrusion of said dough, and means responsive to said photosensitive member in accordance with the area of the silhouette projected thereon by said extruded dough as it intercepts said beam.

11. The apparatus of claim 9, wherein said measuring means comprises a first photosensitive member, a source of light, means for directing a beam from said light source toward said first photosensitive member across the path of extrusion of said dough, a second photosensitive member connected in opposition to the first photosensitive member and exposed to said light source, and adjustable masking means positioned between said light source and said second photosensitive member, said control means being responsive to said first and second photosensitive members.

12. The apparatus of claim 9, wherein said control means includes an adjustable pressure control valve, means for connecting said chamber to a source of compressed air through said pressure control valve and means for adjusting said pressure control valve in response to aid measuring means.

13. The apparatus of claim 9, including means for periodically actuating said control means at predetermined intervals related to the actuation of said severing means.

14. The apparatus of claim 9, including a disc disposed below and coaxial with said extrusion nozzle, said dough being radially extruded in the shape of a torus, said severing means comprising a sleeve slidably mounted on said nozzle and vertically movable between a lower closed position engaging said disc and a raised upper position above said disc to define an annular extrusion opening, said measuring means comprising a pair of adjacent photosensitive members and means for projecting a beam of light onto said photosensitive member along a path tangential to said extrusion opening, said control means comprising an adjustable pressure control valve, means for connecting said chamber to a source of compressed air through said pressure control valve, and means for adjusting said pressure control valve in response to the signal across said photosensitive members.

15. The apparatus of claim 14, including means for periodically actuating said measuring means at predetermined intervals related to said severing actuating means.

16. The apparatus of claim 14, including means for periodically actuating said measuring means at predetermined intervals related to said severing actuating means and means for adjusting said predetermined intervals.

17. The apparatus of claim 14, wherein said measuring means includes a storage capacitor, means for periodically charging said storage capacitor at predetermined intervals relative to said severing actuating means to a value responsive to the signal across said photosensitive members, said control means being responsive to the charge on said capacitor.

18. The apparatus of claim 14, wherein said measuring means includes a storage capacitor, means for periodically charging said storage capacitor at predetermined intervals relative to said severing actuating means to a value responsive to the signal across said photosensitive members, said control means comprising a reversible motor connected to said pressure regulating valve, and means for energizing said motor in a sense responsive to the charge on said capacitor.

19. The apparatus of claim 14, wherein said measuring means includes a storage capacitor, means for periodically charging said storage capacitor at predetermined intervals relative to said severing actuating means to a value responsive to the signal across said photosensitive members, said control means comprising a reversible motor connected to said pressure regulating valve and means for energizing said motor at predetermined times related to the actuation of said severing means in a sense responsive to the charge on said capacitor and for an adjustable predetermined interval.

20. The apparatus of claim 14, including a masking member adjustably movable across the face of one of said photosensitive members, the other of said photosensitive members being in the path of the shadow cast by the dough extruded through said extrusion opening.

21. The apparatus of claim 14, including a first tubular member located between said photosensitive members and said extrusion opening and a second tubular member located between said light source and said extrusion opening and means for effecting a flow of air through said tubular members away from said photosensitive members and said light source respectively.

22. The apparatus of claim 14, wherein said measuring means includes a storage capacitor, means for periodically charging said storage capacitor at predetermined intervals relative to said severing actuating means to a value responsive to the signal across said photosensitive members, said control means being responsive to the charge on said capacitor, and means for adjusting the response level of said control means.

References Cited

UNITED STATES PATENTS 1,559,729 11/1925 Morris.
2,779,298 1/1957 Chwirut et al.

EDWARD L. ROBERTS, Primary Examiner

U.S. Cl. X.R.

18—12; 107—27